United States Patent
Kawano et al.

(12)

(10) Patent No.: US 6,832,354 B2
(45) Date of Patent: Dec. 14, 2004

(54) COMPUTER SYSTEM, ON-SCREEN KEYBOARD GENERATION METHOD, POWER-ON-PASSWORD CHECKING METHOD AND MEMORY

(75) Inventors: Seiichi Kawano, Sagamihara (JP); Yuhko Ohmori, Sagamihara (JP); Takayuki Akai, Sagamihara (JP); Hidetoshi Mori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/872,587

(22) Filed: Jun. 1, 2001

(65) Prior Publication Data

US 2002/0054120 A1 May 9, 2002

(30) Foreign Application Priority Data

Jul. 17, 2000 (JP) ........................................ 2000-216039

(51) Int. Cl.[7] ................................................ G09G 5/00
(52) U.S. Cl. ....................... 715/771; 345/168; 345/173
(58) Field of Search .............................. 345/741, 742, 345/743, 771, 773, 168, 172, 171, 173, 780; 713/186

(56) References Cited

U.S. PATENT DOCUMENTS

| 4,479,112 A | * | 10/1984 | Hirsch ........................... 380/52 |
| 4,857,914 A | * | 8/1989 | Thrower ...................... 340/5.54 |
| 5,161,190 A | * | 11/1992 | Cairns .......................... 713/183 |
| 5,251,096 A | * | 10/1993 | Hosoi et al. ................. 361/695 |
| 5,949,348 A | * | 9/1999 | Kapp et al. .................. 340/5.4 |

* cited by examiner

Primary Examiner—Cao (Kevin) Nguyen
Assistant Examiner—Ting Zhou
(74) Attorney, Agent, or Firm—Martin J. McKinley; Dillon & Yudell LLP (57) ABSTRACT

A computer system requiring input of a password on startup has an on-screen keyboard generation division for displaying an on-screen keyboard having a predetermined key layout on a touch panel, a keyboard type determination division for determining the key layout of the on-screen keyboard displayed on this touch panel, and a password checking division for processing a password inputted by pointing to the on-screen keyboard displayed on this touch panel. The key layout displayed on the touch panel is determined by a user pressing a particular key on a mechanical keyboard, which identifies which layout is to be displayed on the touch panel.

20 Claims, 9 Drawing Sheets

```
                    ┌─ 601
┌───────────────────────────────────┬──────────────────┐
│             Password              │ Item Specific Help│
├───────────────────────────────────┼──────────────────┤
│                                   │                  │
│   On-Screen Keyboard Type [Type-E]│                  │
│   Power-On Password       [Disabled]│                │
│   Supervisor Password     [Enabled] │                │
│   Hard Disk Password      [Disabled]│                │
│                                   │                  │
└───────────────────────────────────┴──────────────────┘
```

Figure 7

```
                    ┌─ 601              ┌─ 701
┌───────────────────────────────────┬──────────────────┐
│             Password              │ Item Specific Help│
├───────────────────────────────────┼──────────────────┤
│   On-Screen Keyboard Type [Type-E]│                  │
│   Power-On Pa┌─────────────────────────┐             │
│   Supervisor │  On-Screen Keyboard Type │             │
│   Hard Disk P├─────────────────────────┤             │
│              │  Press 'Z' key           │             │
│              │                          │             │
│              │  Current Selection [Type-E]│           │
│              └─────────────────────────┘             │
└───────────────────────────────────┴──────────────────┘
```

COMPUTER SYSTEM, ON-SCREEN KEYBOARD GENERATION METHOD, POWER-ON-PASSWORD CHECKING METHOD AND MEMORY

BACKGROUND OF THE INVENTION

1. Field of the Invention

The present invention relates to a method of inputting a password from a touch panel in a computer system having the touch panel as an input device.

2. Description of Related Art

As security in a computer, there is a method by which a user is authorized to log in by a password. Power-on-password is a kind of this method. That is, a password is checked when the computer is switched on, and the operating system (hereinafter, OS) is booted only in the case where a correct password is inputted.

As this power-on-password is executed before startup of the OS, the process of checking a password is executed under the basic input/output system (BIOS). In this case, information inputted from the keyboard is processed by scan code rather than ASCII code (alphabet). Scan code is code data associated with the positions of the keys on a keyboard. That is, according to the position of the pressed (or released) key on the keyboard, a corresponding value is sent from the keyboard to the CPU.

Thus, while a user will memorize and input a password as a combination of alphabets and numbers, a check of a password by the BIOS is performed in a data row of scan code without reference to the alphabets and numbers.

This means that a password can be processed without reference to a kind of language the keyboard supports. That is, a keyboard has several types of key layout according to the kinds of language it supports. However, as a password is checked by a data row of scan code generated according to the positions of the pressed keys, it is not necessary to have enormous amounts of information on key layouts in the BIOS.

Incidentally, along with proliferation of the information processing environment using computers, there are apparatuses of various forms being developed today as terminals for inputting and outputting information. There are some among them that have, as an input device, a touch panel doubling as a display device together with a keyboard. It is desirable that, also in inputting a power-on-password on startup, these kinds of terminals are capable of inputting by the touch panel as well as the keyboard.

As a means to input a power-on-password from a touch panel, a method is thinkable, by which the same kind of keyboard as a built-in keyboard (hereinafter, referred to as on-screen keyboard) is displayed on the touch panel display screen and the input from this on-screen keyboard (touch panel) emulates key entry software-wise.

As mentioned above, however, users memorize a password as a combination of alphabets and numbers. Therefore, in case of inputting a password by using an on-screen keyboard, it is not sufficient for the on-screen keyboard to only indicate key positions but it is necessary to display key characters corresponding to the key layout of a built-in keyboard. Thus, information on the key layout is required in order to display the on-screen keyboard on the touch panel display screen.

Consequently, in the case where the computer as a product is manufactured for two or more languages, several types of products with different key layouts of a keyboard for corresponding languages will be manufactured. Therefore, several types of on-screen keyboards to be displayed on the touch panel will also be provided so as to correspond to a keyboard of the product.

In consideration of the manufacturing processes of computer products, however, it is not always possible, at the time of writing BIOS into a ROM, to determine the keyboard type of a computer product implementing the ROM.

Thus, means for determining the key layout of the on-screen keyboard is required after the ROM in which BIOS is written is implemented.

Moreover, as a method of determining a keyboard type, a method of electrically classifying keyboards from a mechanical viewpoint (position and form of a key switch and so on) is thinkable. However, as such classification has nothing to do with the key layout types according to languages, this kind of classification method cannot be used to determine key layouts of on-screen keyboards.

Accordingly, key layouts of keyboards cannot be determined by software based on the information (characteristics) that the computer product itself has, and interaction with users is required in order to obtain necessary information.

As a method of having a system recognize a keyboard type, there is conventionally a method of having a user select a keyboard on OS installation or startup. To be specific, it is a method of displaying a list of several keyboards and making a user select an applicable one thereof.

To determine a keyboard type by this method, however, a list of the entire keyboard types to which the computer product corresponds must be provided. In this case, the increased data amount due to the keyboard list cannot be ignored for BIOS of which code size is strictly limited.

Moreover, it is not desirable to make a user select an applicable keyboard from a keyboard list since it requires considerable knowledge and determination on the part of the user.

SUMMARY OF THE INVENTION

An object of the present invention is to allow a keyboard type required for generating an on-screen keyboard to be identified by a simple operation without requiring any knowledge and determination of keyboard types on the part of the user.

To attain the above object of the present invention, a computer system requiring input of a password on startup, is characterized by including: an on-screen keyboard display division for displaying an on-screen keyboard having a predetermined key layout on a display screen; a keyboard type determination division for determining the key layout of the on-screen keyboard displayed on the on-screen keyboard display division; and a password checking division for processing a password inputted by pointing to the on-screen keyboard displayed on this on-screen keyboard display division.

As an input device for inputting this password, a device for pointing this on-screen keyboard can be used. For instance, if a touch panel function is added to a display screen on which the on-screen keyboard is displayed, pointing can be performed by directly touching the keys of the on-screen keyboard on the display screen. Pointing may also be performed by using a general pointing device such as a mouse.

In this case, this keyboard type determination division is characterized by determining a type of the key layout of the keyboard mounted on the system, and rendering this key layout as the key layout of the on-screen keyboard displayed on the on-screen keyboard display division.

This method of determining the key layout of the keyboard is, to be more specific, characterized by prompting a user to press a predetermined key placed in a position unique to the key layout of the keyboard mounted on the system, and determining the type of the key layout of the keyboard based on the position of the pressed key.

DETAILED DESCRIPTION OF THE INVENTION

The present invention provides a computer system characterized by the following configuration. That is, the computer system includes a display device having a touch panel function and displaying the on-screen keyboard used for input of a password, memory storing data of this on-screen keyboard, and a CPU for processing a password inputted by using this on-screen keyboard, and this touch panel, displays this on-screen keyboard based on the data read from this memory at the time of starting up a system.

Furthermore, this computer system can be characterized by further including a mechanical keyboard apart from the on-screen keyboard displayed on the display device, and the on-screen keyboard displayed on the touch panel has a key layout of the same type as this keyboard.

In addition, this CPU is characterized by making an input signal from the on-screen keyboard displayed on the touch panel emulate an input signal by key entry so as to process an inputted password.

Furthermore, this memory is characterized by being a read only memory storing data of this on-screen keyboard as well as a program initially read on startup.

Moreover, in the present invention, a computer system having as input devices a display device having a touch panel function and a mechanical keyboard is characterized in that this keyboard is concealable while not in use, and at the time of starting up the system, inputs a password by using the touch panel function of this display device without showing this keyboard.

To be more specific, this display device can be a flat panel display device and is capable of, as a concealer of the keyboard, covering this keyboard by positioning it on the keyboard with its back face facing the keyboard. And at the time of starting up the system, a password can be inputted by using the touch panel function of this display device without moving said display device from its position on this keyboard.

Moreover, the present invention is a method of generating an on-screen keyboard displayed on the display device as an input device for a computer system, characterized by including the steps of, prompting a user to press a predetermined key placed in a position unique to the key layout of this keyboard of the keys of the keyboard provided for this computer system, identifying the type of the key layout of this keyboard based on the position of the pressed key, and generating an on-screen keyboard having a key layout of the same type as this keyboard according to the results of identifying the type of this key layout.

In more detail, this invention is characterized in that this step of prompting a user to press a key comprises a step of presenting to the user a message prompting to press a Z key on this keyboard, and this step of identifying the type of the key layout includes a step of identifying the type of the key layout of the keyboard based on the position of the pressed Z key.

Key layouts can be broadly divided into three types by noting the alphanumeric keys not including special keys. And the "Z" key is placed in all different positions in these three key layouts. Thus, it is effective to use the "Z" key as a key placed in a position unique to the key layout.

In this case, the step of identifying the type of the key layout of the keyboard is characterized by including a step of determining the position of the pressed key based on scan code associated with the position of the pressed key.

Moreover, the present invention is a method of checking a power-on-password on computer system startup, characterized by including the steps of displaying an on-screen keyboard on a touch panel doubling as a display device; and checking the password inputted by pointing to the displayed on-screen keyboard against a predetermined proper password.

In more detail, this step of displaying an on-screen keyboard is characterized by including the steps of reading data of the on-screen keyboard together with a program initially read on startup from read only memory; and generating an on-screen keyboard based on the read data to display the on-screen keyboard it on the touch panel.

Moreover, the present invention can be provided as memory storing a program for controlling computer processing to make it execute the processes in the above-mentioned method of generating an on-screen keyboard or checking a power-on-password.

In particular, it can be provided, stored together with BIOS in a ROM for storing BIOS.

Hereinafter, a detailed explanation of preferred embodiments of the present invention will be given based on the embodiments shown on the attached drawings.

First, an overview of the present invention is explained. A keyboard used for a computer is comprised of 36 alphanumeric keys (26 alphabets from A to Z and 10 numbers from 0 to 9) used to input a password and an "Enter" key to indicate an end of a password. The types of key layout, by noting these keys, can be broadly divided into the following three types without reference to the kind of input language, excluding key layouts for special uses.

Figure 8:
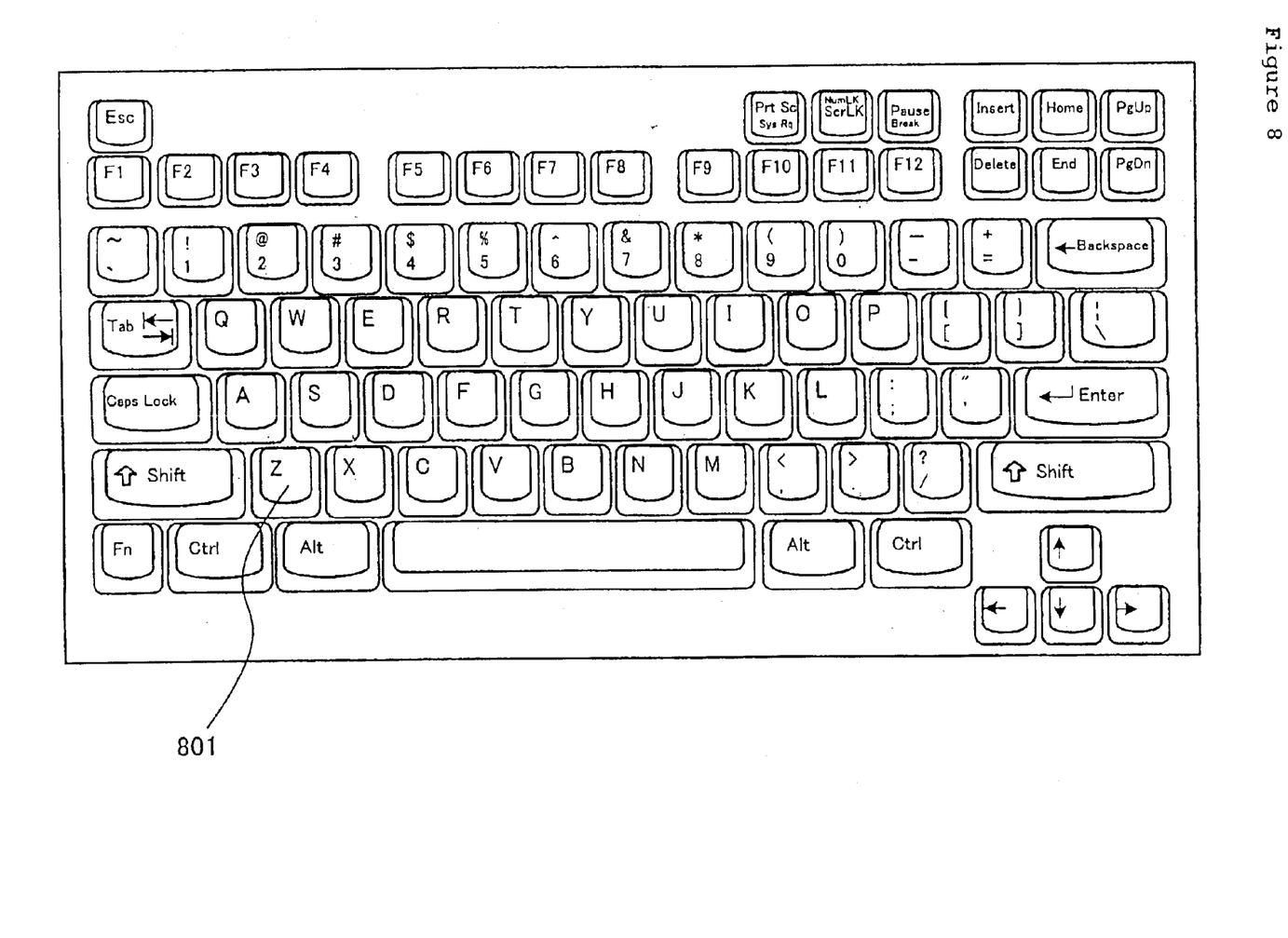
FIG. 8 is a drawing explaining a key layout of Type E (English type)

Type E: English and the same types as English (see FIG. 8)

Figure 9:
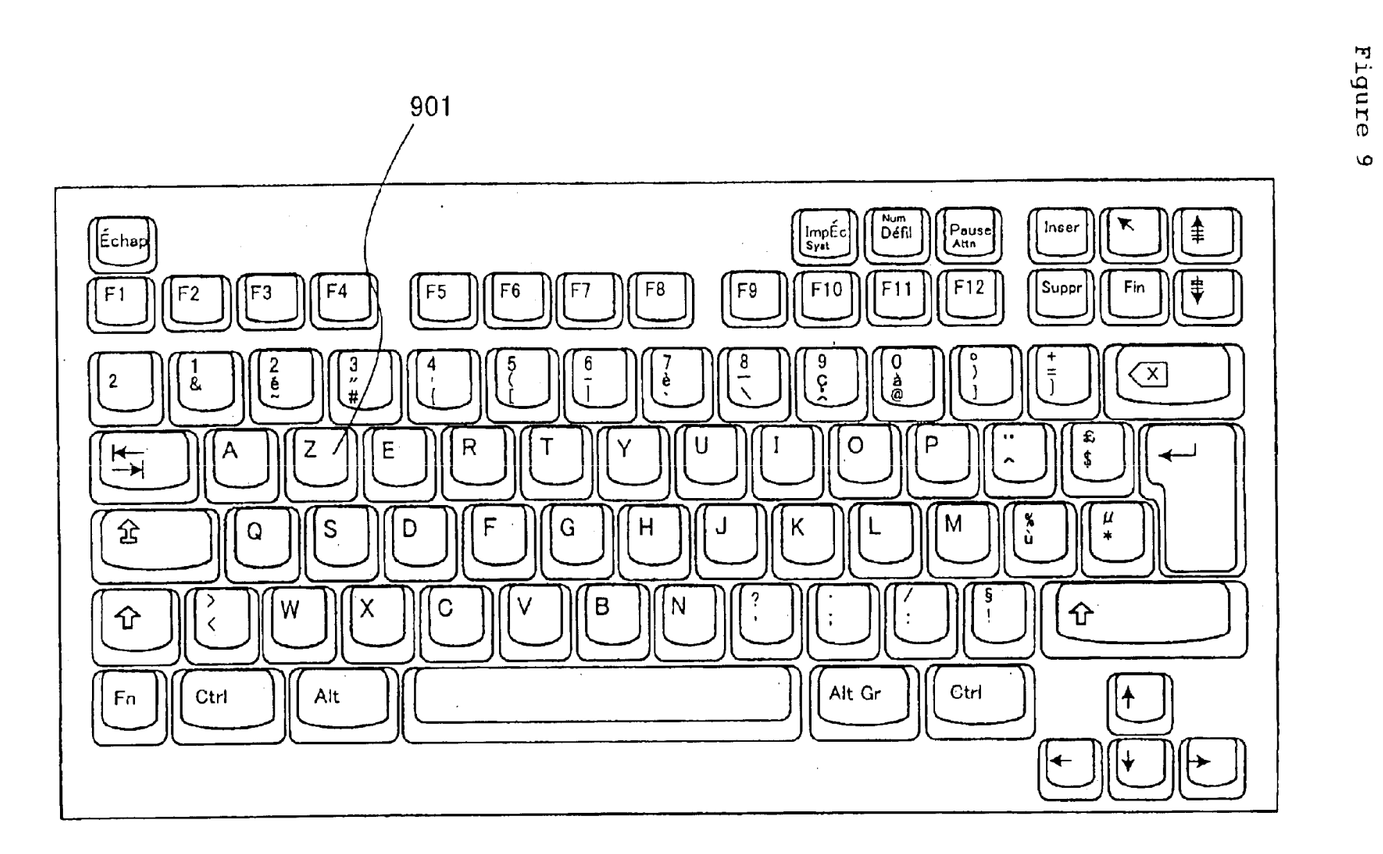
FIG. 9 is a drawing explaining a key layout of Type F (French type)

Type F: French and the same types as French (see FIG. 9)

Figure 10:
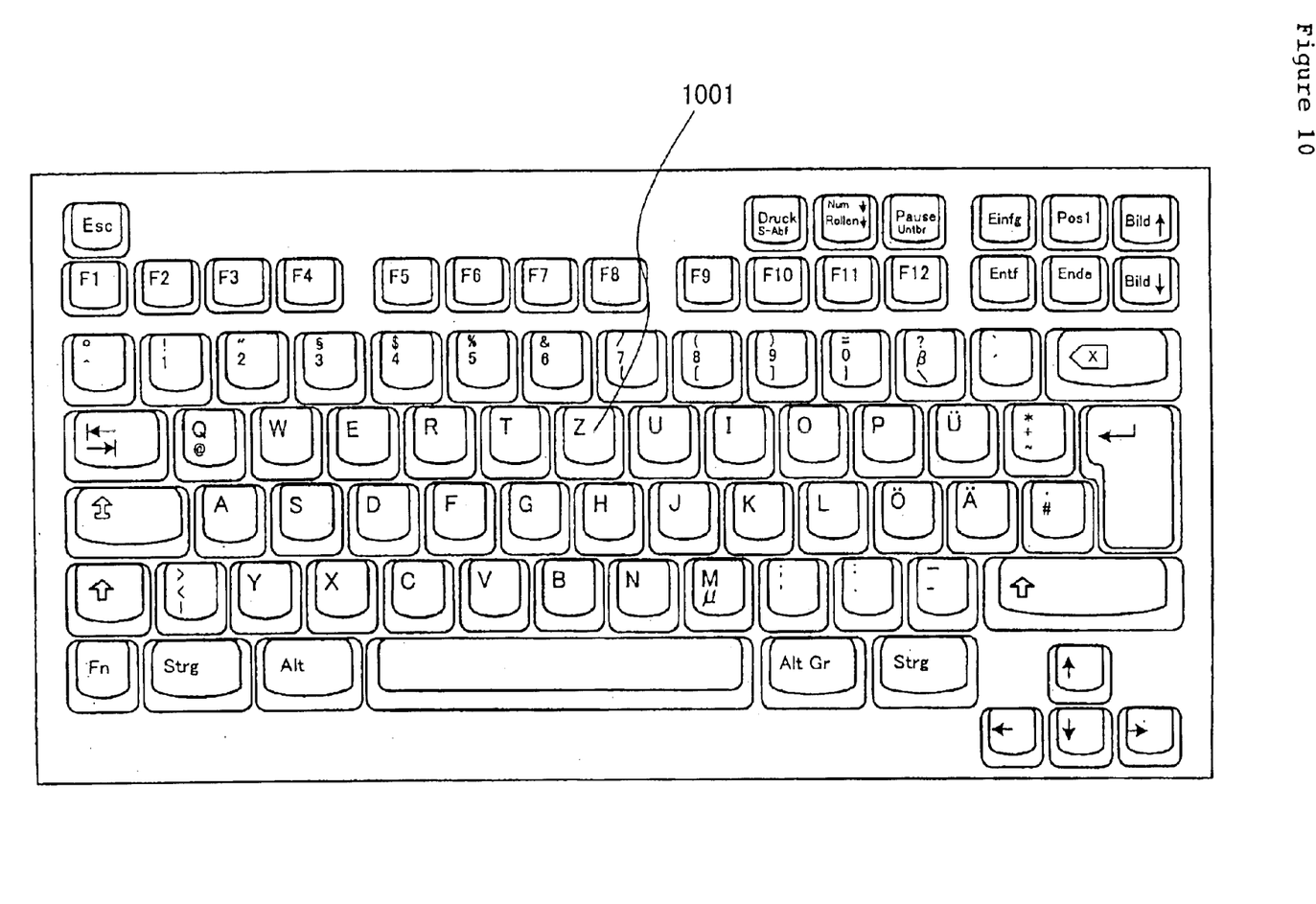
FIG. 10 is a drawing explaining a key layout of Type G (German type).

Type G: German and the same types as German (see FIG. 10)

Thus, to generate an on-screen keyboard for inputting a password, it will be sufficient to have information to identify these three types of key layout.

Moreover, regarding these three types, if a key placed in different positions in all these types can be specified and its positions can be identified, the types of key layout can be identified. Consequently, if the above three types of key layout are compared, it is the "Z" key that is placed in different positions in all these types. Relative to the key layout of Type E (English type) (see a key 801 in FIG. 8), in the case of Type F (French type), it exists in the position of the "W" key of Type E (see a key 901 in FIG. 9). Also, in the case of Type G (German type), it exists in the position of the "Y" key of Type E (see a key 1001 in FIG. 10). Thus, if the position of the "Z" key can be identified, the types of key layout can be identified to the extent of the keys used for inputting a password.

In the present invention, a keyboard type is identified by having a user press the "Z" key to recognize its position in setting BIOS. And then, an on-screen keyboard is generated according to the results of identifying the keyboard to accept input of a password from the user.

Moreover, the present invention requires data of three types of on-screen keyboard to be stored in a ROM. However, the amount of data can be much less compared with a case where enormous key layout information in all the languages that a computer product supports is stored in a ROM.

Figure 1:
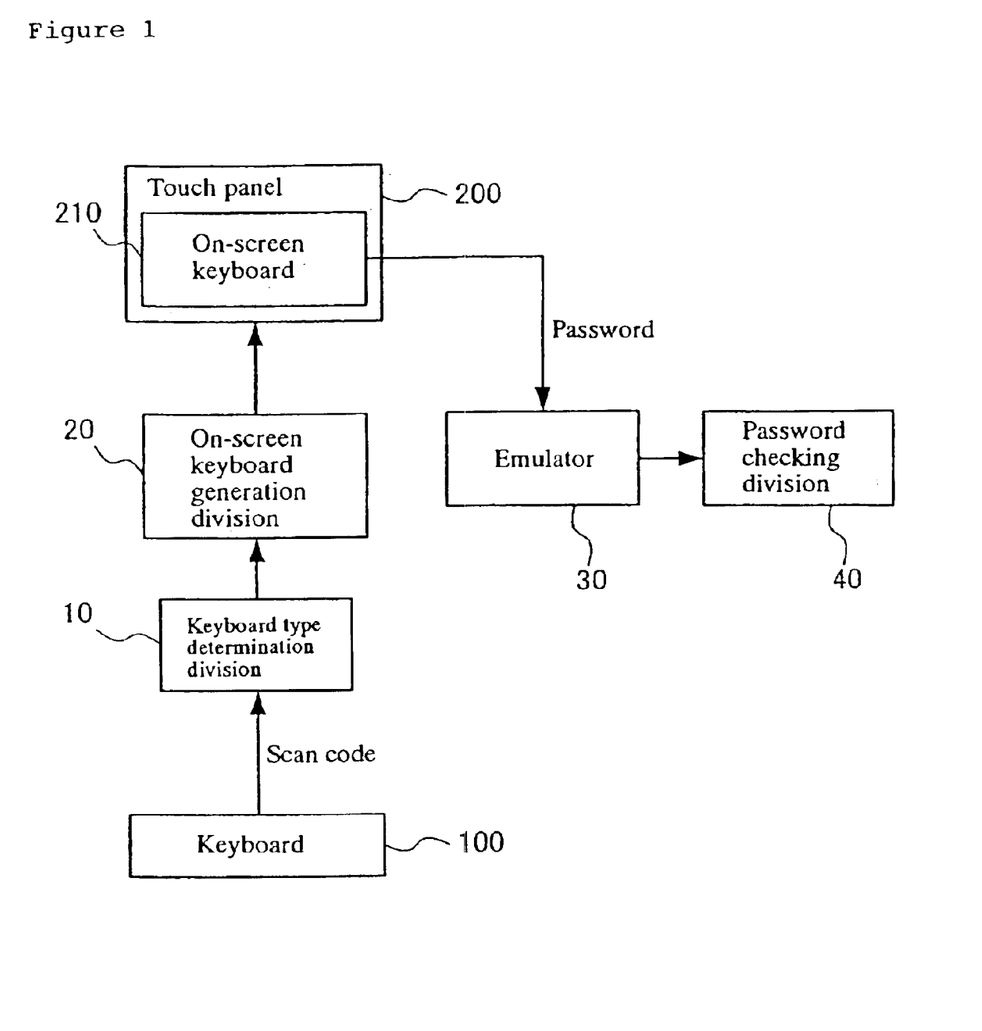
FIG. 1 is a diagram explaining a configuration of a power-on-password processing system in a preferred embodiment.

FIG. 1 is a diagram explaining configuration of a power-on-password processing system in this embodiment. Moreover, the blocks in FIG. 1 (reference numerals 10 to 40 mentioned later) are the functions implemented by a CPU controlled by a part of BIOS and a program stored in a ROM with BIOS, shown in virtual blocks.

In FIG. 1, reference numeral 10 denotes a keyboard type determination division, which determines the "Z" key's position on a keyboard 100 by scan code inputted from the keyboard 100 so as to determine the type of the keyboard 100. Reference numeral 20 denotes an on-screen keyboard generation division, which generates an on-screen keyboard 210 that is the same type as the keyboard 100 according to the results of determination by the keyboard type determination division 10. Reference numeral 30 denotes an emulator, which has input from the on-screen keyboard 210 generated in an on-screen keyboard generation division 20 emulate key entry by the keyboard 100. Reference numeral 40 is a password checking division, which checks a password inputted via the emulator 30.

Moreover, the keyboard 100 is a keyboard as the hardware provided for the computer product on which the power-on-password processing system of FIG. 1 is mounted. Also, a touch panel 200 doubles as a display device displaying the on-screen keyboard 210 and used for input of a password.

In the above configuration, the keyboard type determination division 10 requires a user to press the "Z" key on the keyboard 100. And it identifies the type of key layout of the keyboard 100 based on scan code sent from the keyboard 100. In the case where the scan code used in the system is scan code set 1, as to the above-mentioned three types, the scan code is 2C (hexadecimal notation) if the keyboard 100 is Type E. Also, if the keyboard 100 is Type F, the scan code is 11 (hexadecimal notation). Likewise, if the keyboard 100 is Type G, the scan code is 15 (hexadecimal notation). Likewise, in the case where the scan code used in the system is scan code set 2 or 3, the scan code is 1A (hexadecimal notation) if the keyboard 100 is Type E. Also, if the keyboard 100 is Type F, the scan code is 1D (hexadecimal notation). Likewise, if the keyboard 100 is Type G, the scan code is 35 (hexadecimal notation).

The results of determination thus obtained are sent to the on-screen keyboard generation division 20. A request to press the "Z" key can be made, for instance, by displaying a message prompting a user to press the "Z" key on the display screen of the touch panel 200 doubling as a display device.

The on-screen keyboard generation division 20 generates the on-screen keyboard 210 according to the results of identification by the keyboard type determination division 10. The generated on-screen keyboard 210 is displayed on the touch panel 200 doubling as a display device.

Figure 3:
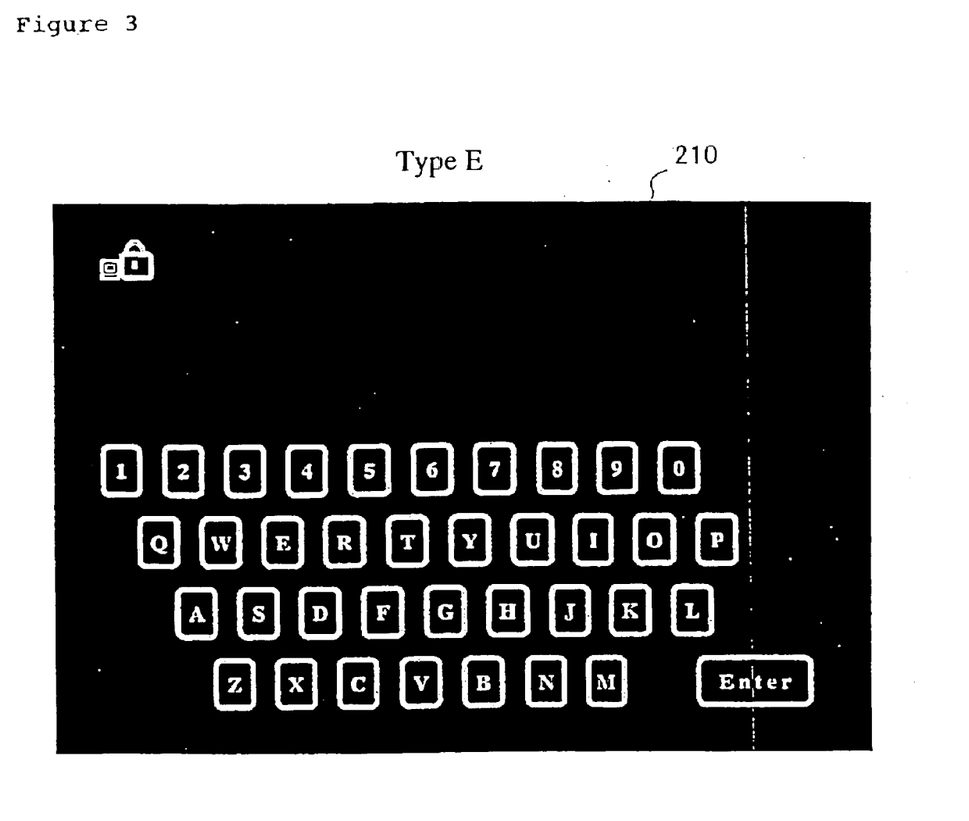
FIG. 3 is a drawing showing an example of display of an on-screen keyboard of Type E (English type)
Figure 4:
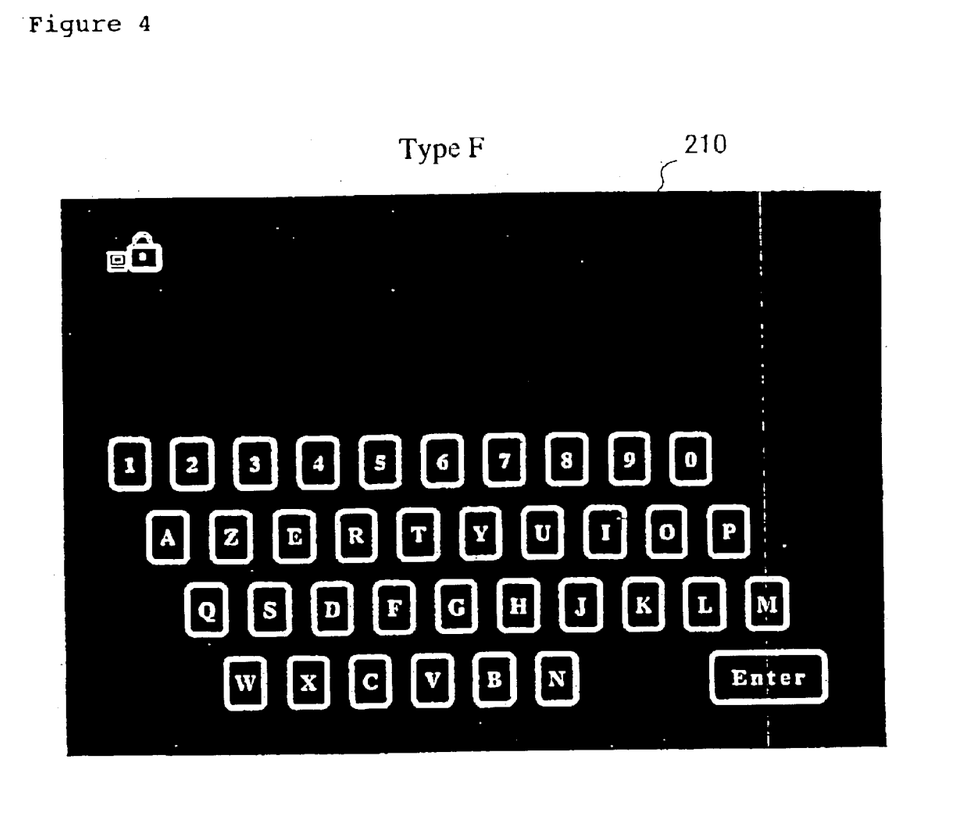
FIG. 4 is a drawing showing an example of display of an on-screen keyboard of Type F (French type)
Figure 5:
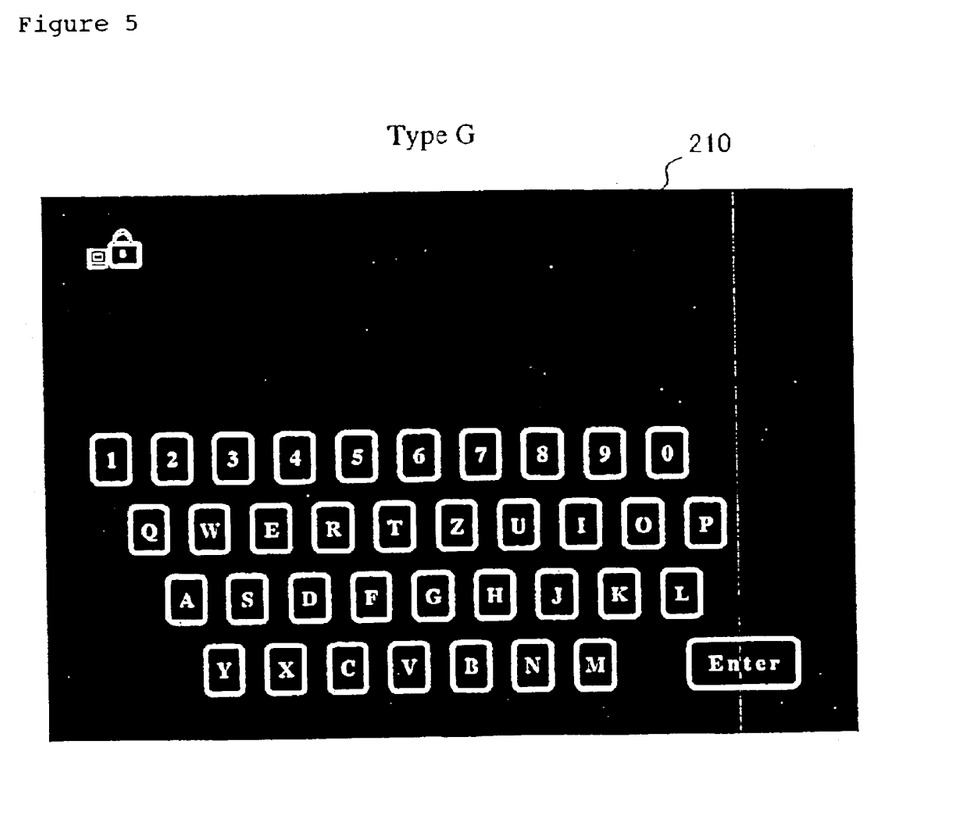
FIG. 5 is a drawing showing an example of display of an on-screen keyboard of Type G (German type)

FIG. 3 is an example of display of the on-screen keyboard 210 of Type E (English type), FIG. 4 is an example of display of the on-screen keyboard 210 of Type F (French type), and FIG. 5 is an example of display of the on-screen keyboard 210 of Type G (German type). Data of these on-screen keyboards 210 is stored in a ROM together with BIOS. The on-screen keyboard generation division 20 reads data of the applicable on-screen keyboard 210 according to the type of the keyboard 100 identified by keyboard type determination division 10 from the ROM and displays it on the touch panel 200.

The 36 alphanumeric keys required to input a password and an "Enter" key are displayed on the on-screen keyboard 210 shown in the diagram. A user can input a password combining alphabets and numbers in his or her memory by using these on-screen keyboards 210 displayed on the touch panel 200.

The emulator 30 converts data inputted by the on-screen keyboard 210 shown in FIG. 3 to FIG. 5 into scan code inputted by operating the keyboard 100. If a user inputs a correct password, the scan code converted by the emulator 30 will be identical with the scan code outputted from keyboard 100 in the case where a correct password is inputted therefrom.

The password checking division 40 checks a data row of scan code against a data row of a correct password. The data row of scan code to be checked may be either a data row converted by the above emulator 30 or a data row directly inputted from the keyboard 100. As a check of power-on-password is executed prior to startup of OS on switching on the computer, if the inputted data row is a correct password, then the boot-up process is continuously executed and the OS is loaded. As opposed to this, if the inputted data row is not a correct password, then the boot-up process is suspended, and predetermined error processing such as a request to input the password again is performed.

Figure 2:
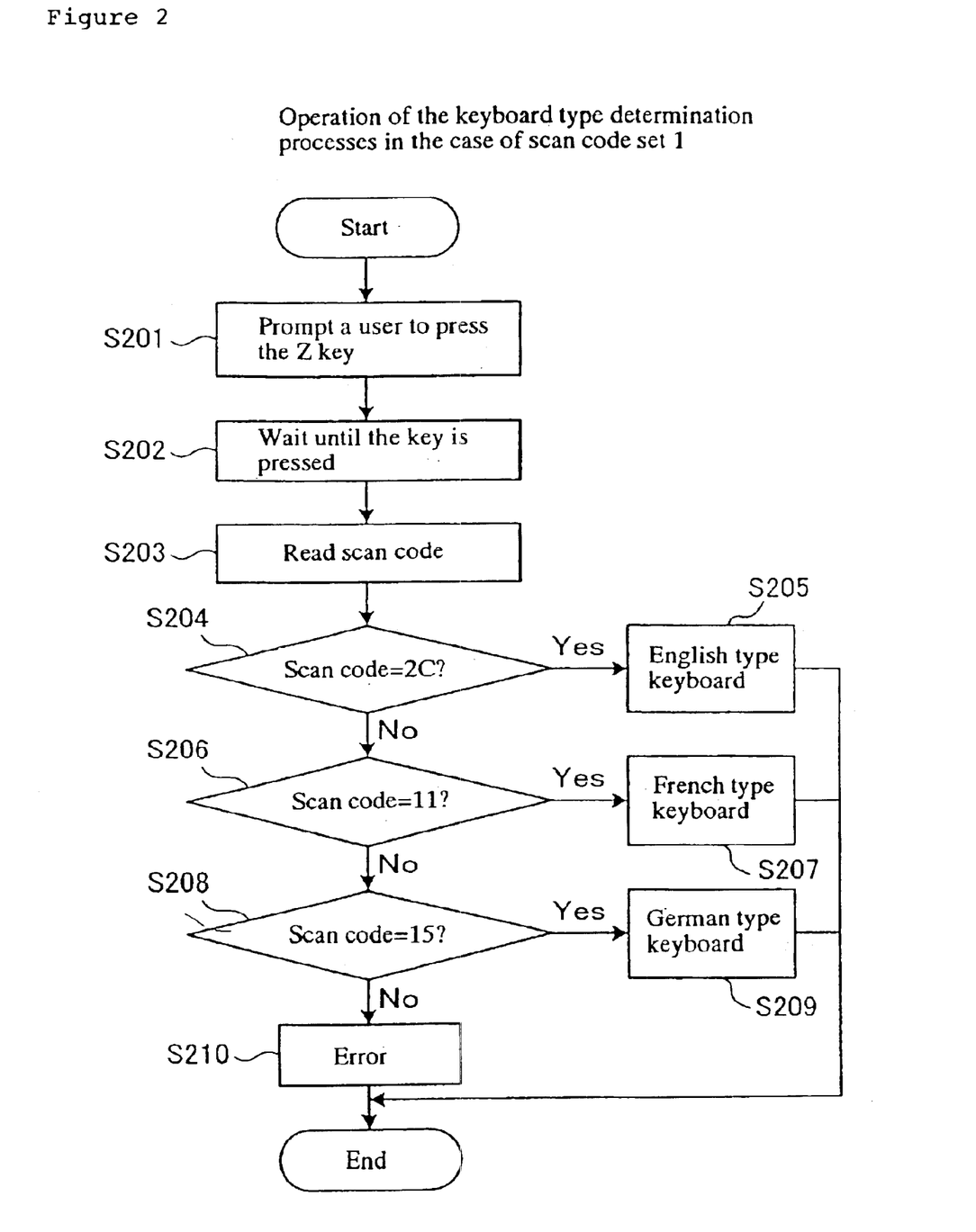
FIG. 2 is a flowchart explaining processes by a keyboard type determination division for determining a keyboard type in a preferred embodiment.

FIG. 2 is a flowchart explaining the processes by the keyboard type determination division 10 for determining the type of the keyboard 100 in this embodiment configured as above. Moreover, this flowchart shows the operation in the case of using scan code set 1 for scan code.

In FIG. 2, the keyboard type determination division 10 first requests a user to press the "Z" key of the keyboard 100 (step 201), and then waits for the key to be pressed (step 202). It is desirable that, considering that determination of the type of the keyboard 100 is related to the password setting in BIOS, this request be made on the password setting screen of the BIOS setting screens.

Figure 6:
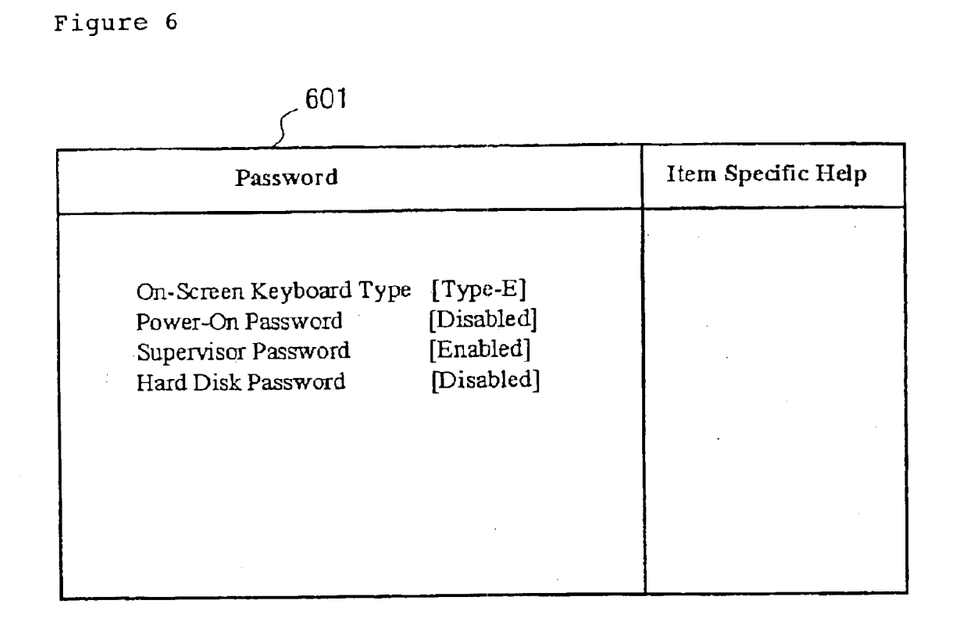
FIG. 6 is a diagram showing an example of a display of a password setting screen on a BIOS setting screen.
Figure 7:
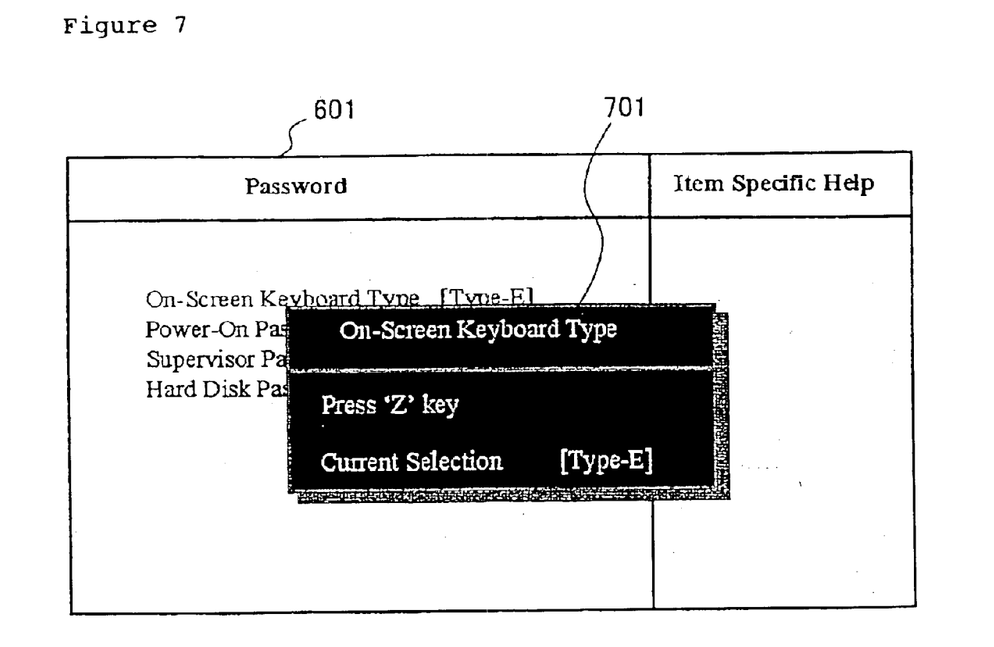
FIG. 7 is a diagram showing a state of displaying a message requesting that a "Z" key be pressed on the password setting screen of FIG. 6.

FIG. 6 is a diagram showing an example of display of the password setting screen in BIOS, and FIG. 7 is a diagram showing a state of displaying a message requesting that the "Z" key be pressed on the password setting screen of FIG. 6. These screens are displayed on the touch panel 200 or a display device or the like connected apart from the touch panel 200.

In FIG. 6, Type E (Type-E) is set as a default in the item of "On-Screen Keyboard Type" on the first line on a password setting screen 601. In FIG. 7, a message 701 requesting that the "Z" key be pressed is displayed in order to determine the keyboard type in this item of "On-Screen Keyboard Type" on the first line.

The user is not required to have knowledge of keyboard types (key layouts) because the keyboard type is determined just by pressing the "Z" key of the keyboard 100 in compliance with the message 701.

Moreover, apart from displaying a message on the touch panel 200 or a display device in this way, it is possible to prompt the user to press the "Z" key by using other means such as outputting a voice message.

If a user presses a key on the keyboard 100, data of scan code corresponding to the pressed key is sent from the keyboard 100. The keyboard type determination division 10 reads the data of the scan code sent from the keyboard 100 (step 203), and determines the type of the keyboard 100 based on the data. That is, as it is a case of scan code set 1, it is determined as Type E if the data is 2C (hexadecimal notation) (steps 204, 205), determined as Type F if it is 11 (hexadecimal notation) (steps 206, 207), and determined as Type G if it is 15 (hexadecimal notation) (steps 208, 209). Moreover, if it is none of these, the user must have pressed a key other than the "Z" key, and so error processing is performed such as requesting that the "Z" key be pressed again (step 210).

Moreover, as this operation is intended to set information required to generate the on-screen keyboard 210 that is used to input a power-on-password, it is performed in a stage different from input of the power-on-password. That is, after determining the type of key layout of the on-screen keyboard 210 by this operation, on the next startup, the on-screen keyboard 210 of the determined key layout is displayed on the touch panel 200. And input of a password is accepted by pointing to the displayed on-screen keyboard 210.

Power-on-password setting and checking processes are the same as those by a conventional keyboard.

The power-on-password processing system in this embodiment can accept input of a password either from the on-screen keyboard 210 displayed on touch panel 200 or the keyboard 100. This enhances convenience of a computer system having touch panel 200. In particular, in a system wherein it is operated in main uses by pen input using the touch panel 200 or something similar and secondarily using the keyboard 100 hidden in ordinary condition, it is quite convenient since it is not necessary to put out the keyboard 100 on startup every time and a password can be inputted from the touch panel 200 with the keyboard 100 remaining hidden.

For instance, in a system wherein the touch panel 200 is a flat panel display device covering the keyboard 100 by positioning itself thereon when not inputting by the keyboard 100, it is possible to input a password by using the on-screen keyboard 210 displayed on the flat panel display device without removing the display device from its position on the keyboard 100.

Furthermore, in the above-mentioned power-on-password processing system of this embodiment, the touch panel 200 doubling as a display device is used as an input device of a password, which is inputted by pointing to the on-screen keyboard 210 displayed on the touch panel 200. It is also possible, however, to make it a system to display the on-screen keyboard 210 on a display device and input a password by using a pointing device such as a mouse.

In addition, the input system using the on-screen keyboard 210 of this embodiment can also be used, apart from input of a power-on-password, as an input system in a system requiring input of a simple command such as an ATM (Automated-Teller Machine).

As explained above, the present invention allows a keyboard type required for generating an on-screen keyboard to be identified by a simple operation without requiring any knowledge and determination of keyboard types on the part of the user.

What is claimed:

1. A computer system comprising;

a mechanical keyboard;

a touch screen; and a keyboard type determination division that prompts a user to press a predetermined key located in a position that is unique for that predetermined key in a unique key layout of the mechanical keyboard, wherein pressing the predetermined key identifies the unique key layout of the mechanical keyboard, and wherein a same unique key layout is displayed on the touch screen.

2. The computer system of claim 3, wherein the predetermined key is a Z key, and wherein the position of to Z key identifies the mechanical keyboard as being laid out for one of the languages English, French or German.

3. The computer system of claim 2 further comprising a CPU for processing a password inputted from the keyboard displayed on the touch screen, wherein the CPU makes an input signal from the on-screen keyboard displayed on the touch panel replicate an input signal from the mechanical key board, thereby processing the inputted password.

4. The computer system of claim 1, wherein the touch screen is capable of, as a concealer of said keyboard, covering the keyboard by positioning it on the keyboard with its back face facing said keyboard.

5. A method comprising:

prompting a user to press a predetermined key placed in a position that is unique for that predetermined key in the unique key layout of a mechanical keyboard provided for a computer system;

identifying the type of the unique key layout of said keyboard based on the position of the pressed key; and generating an on-screen keyboard having a key layout of the same type as said keyboard according to the results of identifying the type of said key layout.

6. The method of claim 5, wherein said step of prompting a user to press the predetermined key comprises a step of presenting to the user a message prompting to press a Z key on said keyboard, and wherein said step of identifying the type of the key layout comprises a step of identifying the type of the key layout of the keyboard based on the position of the pressed Z key, and wherein the position of the Z key identifies the key layout of the keyboard as that for only one language selected from the group of English, French and German.

7. The method of generating an on-screen keyboard as set forth in claim 5, wherein said step of identifying the type of the key layout of the keyboard comprises a step of determining the position of the pressed key based on scan code associated with the position of the pressed key.

8. A method comprising:
- identifying a keyboard location for a specific key, the keyboard location for the specific key being unique to a language dependent keyboard;
- prompting a user to press the specific key on a mechanical keyboard associated with a computer;
- in response to the specific key being pressed, identifying a particular language dependent keyboard according to the keyboard location of the specific key; and
- displaying the language dependent keyboard on a touch screen associated with the computer.

9. The method of claim 8, wherein the specific key is the Z key, and wherein the location of the Z key determines if the language dependent keyboard is for German, English or French.

10. The method of claim 8, wherein the specific key is the W key, and wherein the location of the W key determines if the language dependent keyboard is for English or French.

11. The method of claim 8, wherein the specific key is the W key, and wherein the location of the W key determines if the language dependent keyboard is for German or French.

12. The method of claim 8, wherein the specific key is the Y key, and wherein the location of the Y key determines if the language dependent keyboard is for English or German.

13. The method of claim 8, wherein the specific key is the Y key, and wherein the location of the Y key determines if the language dependent keyboard is for French or German.

14. A computer program product residing on a computer usable medium, the computer program product comprising:
- program code for identifying a keyboard location for a specific key, the keyboard location for the specific key being unique to a language dependent keyboard;
- program code for prompting a user to press the specific key on a mechanical keyboard associated with a computer;
- program code for, in response to the specific key being pressed, identifying a particular language dependent keyboard according to the keyboard location of the specific key; and
- program code for displaying the language dependent keyboard on a touch screen associated with the computer.

15. The computer program product of claim 14, wherein the specific key is the Z key, and wherein the location of the Z key determines if the language dependent keyboard is for German, English or French.

16. A computer system comprising:
- means for identifying a keyboard location for a specific key, the keyboard location for the specific key being unique to a language dependent keyboard;
- means for prompting a user to press the specific key on a mechanical keyboard associated with a computer;
- means for in response to the specific key being pressed, identifying a particular language dependent keyboard according to the keyboard location of the specific key; and
- means for displaying the language dependent keyboard on a touch screen associated with the computer.

17. The computer system of claim 16, wherein the specific key is the Z key, and wherein the location of the Z key determines if the language dependent keyboard is for German, English or French.

18. The computer system of claim 16, wherein the specific key is the W key, and wherein the location of the W key determines if the language dependent keyboard is for English or French.

19. The computer system of claim 16, wherein the specific key is the W key, and wherein the location of the key determines if the language dependent keyboard is for German or French.

20. The computer system of claim 16, wherein the specific key is the Y key, and wherein the location of the Y key determines if the language dependent keyboard is for English or German.

* * * * *